E. S. COWARD.
DETACHABLE WHEEL FOR VEHICLES.
APPLICATION FILED JULY 5, 1921.
1,434,098.
Patented Oct. 31, 1922.
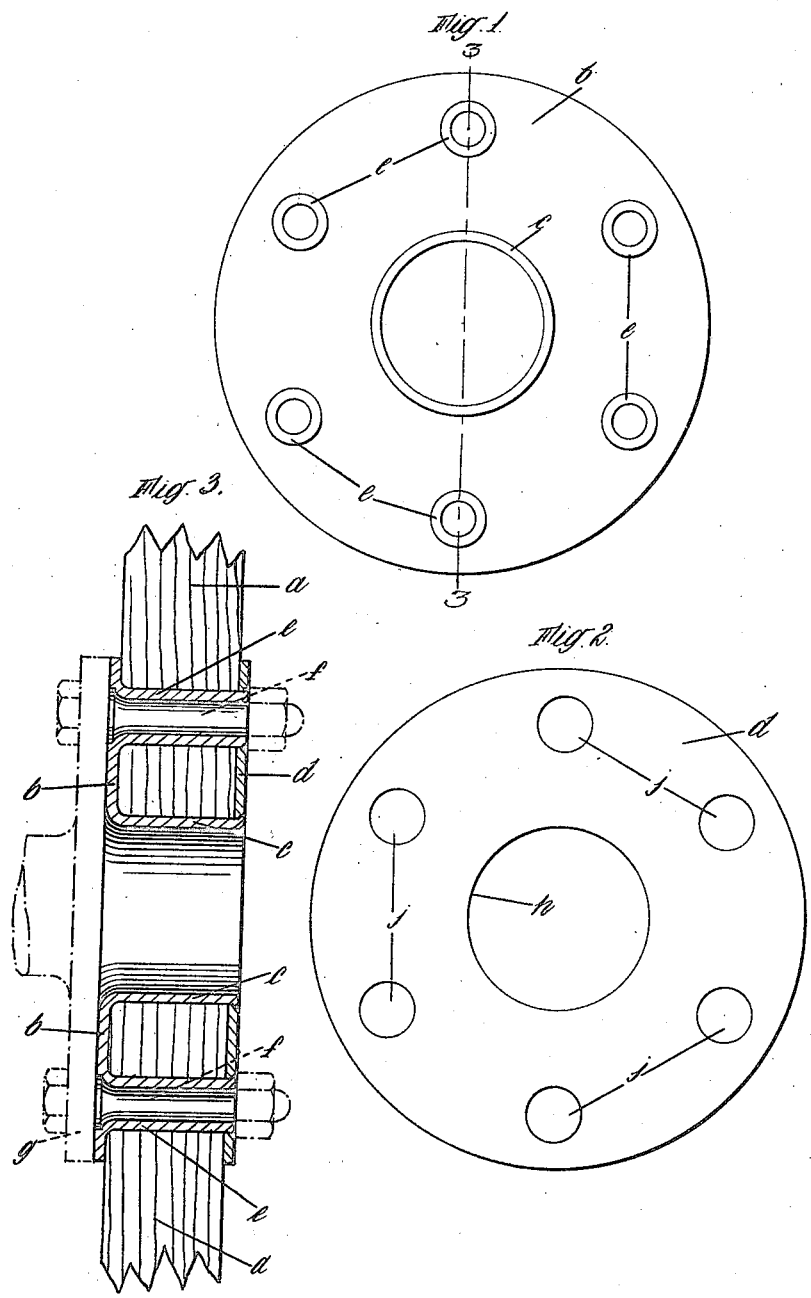
Inventor
Ernest S. Coward
M. H. Lockwood
Attorney Patented Oct. 31, 1922.

1,434,098

UNITED STATES PATENT OFFICE.

ERNEST SMITH COWARD, OF BRADFORD, ENGLAND.

DETACHABLE WHEEL FOR VEHICLES.

Application filed July 5, 1921. Serial No. 482,554.

(GRANTED UNDER THE PROVISIONS OF THE ACT OF MARCH 3, 1921, 41 STAT. L., 1313.)

*To all whom it may concern:*

Be it known that I, ERNEST SMITH COWARD, A. M. I. Mech. E., of 25 Southfield Square, Bradford, in the county of York, England, a British subject, have invented certain new and useful Improvements in or Relating to Detachable Wheels for Vehicles (for which I have filed an application in England July 2, 1920, Patent No. 169,793), of which the following is a specification.

This invention relates to detachable wheels for vehicles of the kind in which a wheel is held upon a hub between two flange plates by bolts extending parallel with the axis of the hub from one of said flange plates which is integral with the hub and passing through apertures in a loose flange plate outside of which the bolts are secured by nuts.

In such detachable wheels apertures are usually bored through the roots of the spokes to give passage to the bolts with the result that the driving strain is transmitted to the wheel only at those parts where the bolts contact with the roots of the spoke. Further, the rusting of the bolts detrimentally affects the spokes themselves, with the result that breakages often occur at the roots of the spokes. The object of the present invention is more equally to distribute the driving strain to the spokes and to avoid the deleterious action of rust.

According to the present invention the roots of the spokes are received in an annular channel formed between a flange plate integral with a hub and a second flange plate, the first mentioned flange plate having cast integral therewith sleeves to give passage to the bolts whilst the second mentioned flange plate is formed with apertures to give passage to the corresponding ends of the hub and sleeves, said ends being riveted over, or otherwise secured after the wheel has been assembled.

One form of the invention is illustrated by the accompanying drawings wherein Figures 1 and 2 are face views of the flange plates and Figure 3 is a cross-section as on the line 3—3 Figure 1 shewing the parts assembled.

As shown in Figure 3 the roots of the spokes *a* are received in an annular channel formed between a flange plate *b* integral with a hub *c* and a second flange plate *d*. The flange plate *b* has cast integral therewith sleeves *e* . . . to give passage to the bolts *f* by which the wheel is secured to the flange *g* of the hub proper. The flange plate *d* is formed with apertures *h* and *j* . . . to give passage to the corresponding ends of the hub *c* and sleeves *e* . . . respectively, and these ends are riveted over as shewn in Figure 3, or spot welded, after the wheel has been assembled.

A wheel so formed may then be placed upon the usual detachable hub referred to above, and the driving thrust is transmitted from the bolts *f* . . . to the sleeves *e* . . . and thence to the roots of the spokes *a* not only at those parts where the sleeves *e* . . . contact with the said roots, but also to a certain extent at the sides of the spokes *a* where the flange plates *b* and *d* contact therewith.

Such a wheel may be readily detached as the swelling of the wooden spokes *a* due to moisture cannot cause the wheel to bind upon the bolts *f* . . . whilst the sleeves *e* . . . also serve to prevent any rusting of the bolts *f* . . . from affecting detrimentally the roots of the spokes *a*. A wheel constructed in accordance with this invention is applicable for use with the usual detachable construction referred to above and is also particularly adapted for use with the detachable construction forming the subject of my British Letters Patent No. 146029.

I claim:—

1. A detachable wheel for vehicles of the kind hereinbefore set forth wherein the roots of the spokes are received in an annular channel formed between a flange plate integral with a hub and a second flange plate, the first mentioned flange plate having cast integral therewith sleeves to give passage to the bolts for securing the wheel to the hub proper whilst the second mentioned flange plate is formed with apertures to give passage to the corresponding ends of the integral hub and sleeves, said ends being secured to said second mentioned flange plate, after the wheel has been assembled.

2. A vehicle wheel substantially as set forth provided with a tubular hub integral with a flange plate from which project a plurality of studs integral therewith and adapted to pass through the roots of the spokes and an annular flange plate fitting over the end of said hub and provided with a corresponding plurality of apertures fitting the ends of said studs, said studs and hub being riveted over at the outer face of said annular flange plate, thereby permanently securing the hub and flanges to the spokes of the wheel.

ERNEST SMITH COWARD.